(12) United States Patent
Eckols (10) Patent No.: US 12,365,030 B2
(45) Date of Patent: Jul. 22, 2025

(54) MULTI-PROPERTY MONOLITHIC STAINLESS STEEL COMPONENT

(71) Applicant: The Boeing Company, Chicago, IL (US)

(72) Inventor: David Ansyl Eckols, Edmonds, WA (US)

(73) Assignee: The Boeing Company, Chicago, IL (US)

(*) Notice: Subject to any disclaimer, the term of this patent is extended or adjusted under 35 U.S.C. 154(b) by 233 days.

(21) Appl. No.: 17/035,969

(22) Filed: Sep. 29, 2020

(65) Prior Publication Data

US 2022/0097135 A1 Mar. 31, 2022

(51) Int. Cl.
*B22F 10/00* (2021.01)
*B22F 3/24* (2006.01)
(Continued)

(52) U.S. Cl.
CPC .............. *B22F 10/00* (2021.01); *B22F 3/24* (2013.01); *B33Y 10/00* (2014.12); *B33Y 30/00* (2014.12);
(Continued)

(58) Field of Classification Search
CPC .. B22F 10/00; B22F 3/24; B22F 10/10; B22F 2301/35; B22F 1/09; B22F 2999/00; B22F 10/28; B22F 10/50; B22F 10/60; B22F 12/20; B22F 12/88; B33Y 10/00; B33Y 30/00; B33Y 70/00; B33Y 80/00; B33Y 40/20; H01F 1/344; H02K 1/02; C22C 38/40; C22C 33/0285; C22C 19/03;
(Continued)

(56) References Cited

U.S. PATENT DOCUMENTS 9,101,979 B2 * 8/2015 Hofmann ................ B22F 10/25
9,731,445 B2 8/2017 Williams
(Continued)

FOREIGN PATENT DOCUMENTS

GB 2262659 A * 6/1993 ......... F02M 51/0614

OTHER PUBLICATIONS

Arabi-Hashemi et al., "3D magnetic patterning in additive manufacturing via site-specific in-situ alloy modification," Applied Materials Today Mar. 18, 2020, pp. 1-9 (Year: 2020).*
(Continued)

*Primary Examiner* — John A Hevey
(74) *Attorney, Agent, or Firm* — Yee & Associates, P.C.

(57) ABSTRACT

An integrally-formed multi-property monolithic stainless steel component, a method of fabricating a multi-property monolithic stainless steel component, and a system for fabricating a multi-property monolithic stainless steel component. The integrally-formed monolithic stainless steel component includes, along a longitudinal direction thereof, one or more non-magnetic regions having an austenitic crystalline grain structure and one or more magnetic regions having a ferritic martensitic crystalline grain structure. The integrally-formed multi-property monolithic stainless steel component is fabricated by a selective laser sintering (SLS) assembly having integrated therein a plurality of sub-assembly components, including a selective powder deposition component, a selective laser sintering (SLS) component, and a localized cooling component.

21 Claims, 8 Drawing Sheets

(51) Int. Cl.
*B33Y 10/00* (2015.01)
*B33Y 30/00* (2015.01)
*B33Y 70/00* (2020.01)
*B33Y 80/00* (2015.01)
*C22C 38/40* (2006.01)
*H01F 1/34* (2006.01)
*H02K 1/02* (2006.01)
*B22F 10/10* (2021.01)

(52) U.S. Cl.
CPC .............. *B33Y 70/00* (2014.12); *B33Y 80/00* (2014.12); *H01F 1/344* (2013.01); *H02K 1/02* (2013.01); *B22F 10/10* (2021.01); *B22F 2301/35* (2013.01); *C22C 38/40* (2013.01)

(58) Field of Classification Search
CPC ..... C22C 19/05; C22C 19/055; C22C 19/056; Y02P 10/25
See application file for complete search history.

(56) References Cited

U.S. PATENT DOCUMENTS

| | | | |
|---|---|---|---|
| 10,673,288 B2* | 6/2020 | Kool | B32B 15/01 |
| 2012/0112571 A1* | 5/2012 | Stephens | H02K 11/014 |
| | | | 310/55 |
| 2012/0244341 A1 | 9/2012 | Tenold et al. | |
| 2014/0049132 A1* | 2/2014 | Yamada | H02K 1/2706 |
| | | | 310/156.66 |
| 2017/0169945 A1* | 6/2017 | Lambourne | B23K 35/0255 |
| 2018/0245192 A1* | 8/2018 | Kweon | G01H 17/00 |
| 2020/0071782 A1 | 3/2020 | Tian et al. | |
| 2021/0099123 A1* | 4/2021 | Yoo | H02P 29/60 |

OTHER PUBLICATIONS

Balmforth et al., "A New Ferritic-Martensitic Stainless Steel Constitution Diagram," Supplement to Welding Journal, Dec. 2000, pp. 339-345 (Year: 2000).*

Knorovsky et al., "Inconel 718: A Solidification Diagram," Metallurgical Transactions A, vol. 20A, Oct. 1989, pp. 2149-2158 (Year: 1989).*

Special Metals, "Inconel 718" data sheet, https://www.specialmetals.com/documents/technical-bulletins/inconel/inconel-alloy-718.pdf, accessed Dec. 8, 2023. (Year: 2023).*

Wallace, John, "Laser control in additive manufacturing leads to magnetic patterns in steel," www.laserfocusworld.com/laseresources/article/14177812/laser-control-in-additive-manufactuing-leads-to-magnetic-patterns-in-steel, Jul. 14, 2020, 3 pages.

Boissonneault, Tess, "Researchers developing sustainable 3D printed super magnets," https://www.3dprintingmedia.network/researchers-developing-sustainable-3d-printed-super-magnets/, Jan. 31, 2020, 4 pages.

Sertoglu, Kubi, "Aerosint and Aconity3D Develop Multi-Material Metal 3D Printer," https://3dprintingindustry.com/news/aerosint-and-aconity3d-develop-multi-material-metal-3d-printer-168919/, 3D Printing Industry, Mar. 10, 2020.

Bhadeshia, H.K.D.H, Interpretation of Microstructure of Steels, https://www.phase-trans.msm.cam.ac.uk/2008/Steel_Microstructure/SM.html, University of Cambridge, 2008, 36 pages.

\* cited by examiner

MULTI-PROPERTY MONOLITHIC STAINLESS STEEL COMPONENT

FIELD

Embodiments relate generally to a stainless steel component, and particularly, to a multi-property monolithic stainless steel component having magnetic and non-magnetic properties in an integrally-formed, monolithic unit. Embodiments also relate to one or more methods of fabricating such a multi-property monolithic stainless steel component, and to a system for fabricating such a multi-property monolithic stainless steel component.

BACKGROUND

Stainless steel, as an alloy material, has the tendency of being either magnetic or non-magnetic, depending upon its final crystalline grain structure configuration. A ferritic martensitic stainless steel has magnetic properties, while an austenitic stainless steel has non-magnetic properties. Generally, when fabricating a stainless steel component, its crystalline grain structure is manipulated by the implementation of heat treatment processes applied to the entire component. Such manipulation of the crystalline grain structure, however, results in the stainless steel component having either fully magnetic properties, or alternatively, fully non-magnetic properties.

SUMMARY

In accordance with one or more embodiments, an integrally-formed multi-property monolithic stainless steel component is fabricated using an additive manufacturing (AM) process that comprises a selective laser sintering (SLS) (also known as selective laser melting (SLM)) assembly that is to imbed magnetic properties inside a core base alloy material as a function of 3D printing. In this way, complex structural geometries can be achieved, including areas not accessible by machining.

In accordance with one or more embodiments, the SLS assembly comprises a selective powder deposition component, a selective laser sintering (SLS) component, and a localized cooling component. The fabrication of such an integrally-formed multi-property monolithic stainless steel component facilitates a consolidation of parts which eliminates the need for assemblies in electro-mechanical actuation applications (e.g., rotary actuators, brushless motors, and microelectronic systems). Moreover, the integrally-formed multi-property monolithic stainless steel component would allow for elimination of moving parts, facilitate systems miniaturization for space, size, and weight reduction, and require no assembly as it comprises an integrally-formed, single, monolithic unit.

In accordance with one or more embodiments, the selective powder deposition component comprises a powder bed machine or duster configured to deposit controlled predetermined amounts of individual alloy components that differ in element distribution to thereby obtain an integrally-formed monolithic structure having regions or zones with different properties than other regions or zones. Such difference in properties can be one or more of mechanical (e.g., strength, ductility, etc.), electric, magnetic properties, and the like.

For instance, the selective powder deposition component may be configured to deposit a controlled predetermined amount of an alloy powder of a first type and a controlled amount of an alloy powder of a second type (that is different than the first type) to represent individual element distribution for two different zones regions having different properties. In one example, the selective powder deposition component may be configured to deposit controlled predetermined amounts of iron and nickel to obtain an integrally-formed multi-property monolithic iron-based alloy (e.g., stainless steel) structure comprising one or more non-magnetic stainless steel zones or regions of low magnetic permeability having an austenitic crystalline grain structure and one or more magnetic stainless steel regions of high magnetic permeability having a ferritic martensitic crystalline grain structure. The selective powder deposition component may be configured to do the same for applications where an integrally-formed multi-property monolithic structure having different mechanical properties or electric properties are desired.

In accordance with one or more embodiments, the SLS component is configured to selectively fuse the controlled predetermined deposited amounts of alloy powders in vertically-extending build layers or build layer groups. Using a laser, the SLS is configured to selectively fuse powdered alloy material by scanning cross-sections generated from a 3-D digital description of the component on the surface of a powder bed. After each cross-section is scanned, the powder bed or build plate is lowered by one build layer thickness (e.g., 20 to 90 microns), and a new layer of build material is applied thereon and/or thereover.

In accordance with one or more embodiments, using the iron-based alloy example, the localized cooling component is configured to provide, in situ, localized cooling and control of the crystalline grain structure at specific zones or regions of each build layer group (comprising one or more individual build layers) to form one or more non-magnetic regions of low magnetic permeability having an austenitic crystalline grain structure and one or more magnetic regions of high magnetic permeability having a ferritic martensitic crystalline grain structure. In one or more embodiments, the localized cooling component comprises a CNC local cooling component having a movable robotic arm configured to move in response to one or more predetermined commands from a computing system(s) to modify the cooling rate of an individual build layer or build layer group to manipulate the grain structure.

For example, to obtain one or more regions or zones having non-magnetic properties of low magnetic permeability and an austenitic stainless steel grain structure, an individual build layer or build layer group can be slowly cooled by the robotic arm. The localized cooling process can be repeated until the section of the component requiring non-magnetic properties is completed.

To obtain one or more regions or zones having magnetic properties of high magnetic permeability and a ferritic martensitic stainless steel grain structure, an individual build layer or build layer group can be rapidly cooled by the robotic arm via a localized quenching process that uses a chilled or controlled temperature inert gas directed onto the surface of the build layer to control the cooling temperature of the phase transformation. The localized cooling process can be repeated for each subsequent individual build layer or build layer group of the component requiring magnetic properties.

Accordingly, an integrally-formed multi-property monolithic stainless steel component can be fabricated via additive manufacturing (3D Printing) using controlled predetermined deposited amounts of alloy powders that differ in elemental per individual build layer or build layer group in the powder bed machine. The powder configuration, using a duster, can, on one hand, selectively regulate or otherwise control the distribution of two predetermined alloy components (e.g., nickel and chromium for stainless steel) that differ in elemental concentration to obtain an austenitic crystalline grain structure for non-magnetic regions of the component. On the other hand, the duster can selectively deposit a higher or greater iron content alloy type in an individual build layer or build layer group to obtain a ferritic martensitic crystalline grain structure for magnetic regions of high magnetic permeability in the integrally-formed monolithic component. Meaning, the selective laser melting component can be configured to selectively deposit, where needed, the alloy type of higher or greater nickel and iron element distribution to obtain a ferritic martensitic crystalline grain structure. The resultant stainless steel component would exhibit multiple alloy properties in a single, integrally-formed monolithic structure. The magnetic regions of high magnetic permeability having high iron concentrations can then be magnetized for use, for example, as a single rotor component.

Practice of one or more methods set forth, described, and/or illustrated herein facilitates the control of all the parameters (temperature, time/cooling rate, chemical composition, etc.) involved in manipulating any area of the material phase diagram (e.g., heating via the SLS component, cooling/quenching from the localized cooling component, and chemical manipulation via by selective material deposition component). The resultant integrally-formed multi-property monolithic stainless steel component has regions that are fully designed for maximum performance, and particularly, one or more ferritic martensitic stainless steel magnetic zones of high magnetic permeability and one or more austenitic stainless steel non-magnetic zones of low magnetic permeability.

The features, functions, and advantages that have been discussed can be achieved independently in various embodiments or may be combined in yet other embodiments further details of which can be seen with reference to the following description and drawings.

DRAWINGS

The various advantages of the embodiments of the present disclosure will become apparent to one skilled in the art by reading the following specification and appended claims, and by referencing the following drawings, in which:

DESCRIPTION

In accordance with one or more embodiments, an integrally-formed multi-property monolithic stainless steel component having both magnetic and non-magnetic properties which are fabricated via an additive manufacturing (AM) process that includes a selective laser sintering (SLS) assembly comprising a selective powder deposition component or duster, a selective laser sintering (SLS) component, and a localized cooling component. In particular, the selective laser sintering (SLS) assembly and its sub-assembly components is to fabricate an integrally-formed multi-property monolithic stainless steel component in a manner so as to impart one or more non-magnetic regions of low magnetic permeability having a first type of crystalline grain structure (austenitic) and one or more magnetic regions of high magnetic permeability having a second type of crystalline grain structure (ferritic martensitic) grain structure that is different than the first type. Such a fabrication is to yield an integrally-formed monolithic component having a structural center or shaft that has the first type of crystalline grain structure (austenitic) and magnetic poles that have the second type of crystalline grain structure (ferritic martensitic). Although AM process in accordance with one or more embodiments comprises an SLS or SLM assembly, embodiments are not limited therewith. Thus, this disclosure contemplates other 3D printing processes having an integrated localized cooling component, including but not limited to a powder-bed fusion (PBF) process comprising electron beam melting (EBM) that uses an electron beam (instead of laser) to selectively melt the defined geometries at each individual build layer or build layer group.

FIGS. 1 to 4 illustrate an example of an integrally-formed multi-property monolithic stainless steel component 10. Although the illustrated integrally-formed multi-property monolithic stainless steel component 10 is to be implemented in electro-mechanical actuation applications (e.g., rotary actuators, brushless motors, and microelectronic systems), embodiments are not limited therewith. Thus, this disclosure contemplates the integrally-formed multi-property monolithic stainless steel component 10 having application in other technologies that fall within the spirit and scope of the principles of this disclosure set forth herein.

For example, the integrally-formed multi-property monolithic stainless steel component can have application as a component in micro-electric motors, micro-stepper motors (rotor and stator), linear solenoids and actuators, rotating solenoids, and actuators of a micro-machine. Such an integrally-formed multi-property monolithic stainless steel component would minimize the size, part count, and complexity of such micro-machines, which are commonly application in robotics, drones, cellphone vibrating motor, etc. where size and weight are critical to overall performance.

Another example the integrally-formed multi-property monolithic stainless steel component can have application is in sensor systems where corrosion and chemical compatibility is a factor and normal fully ferritic magnets would not survive aggressive chemical exposures (e.g., rotary or linear speed sensors that are exposed to acidic industrial environments).

A further example the integrally-formed multi-property monolithic stainless steel component can have application is in the food processing industry as a simplification food grade magnetic sensor, where stainless steel materials are desired.

Yet an additional example the integrally-formed multi-property monolithic stainless steel component can have application in is the food, marine, and chemical industries, as a component in rotary solenoid valves and pumps.

Yet and still, a further example the integrally-formed multi-property monolithic stainless steel component can have application is in purification systems that separate magnetic particles from a solution, where the magnets are to be directly exposed to the working environment, such as removing magnetic particles from a contaminated cutting fluid in the machining industry (e.g., removing steel grinding dust and chips to purify and reuse machining cutting fluids).

Figure 1:
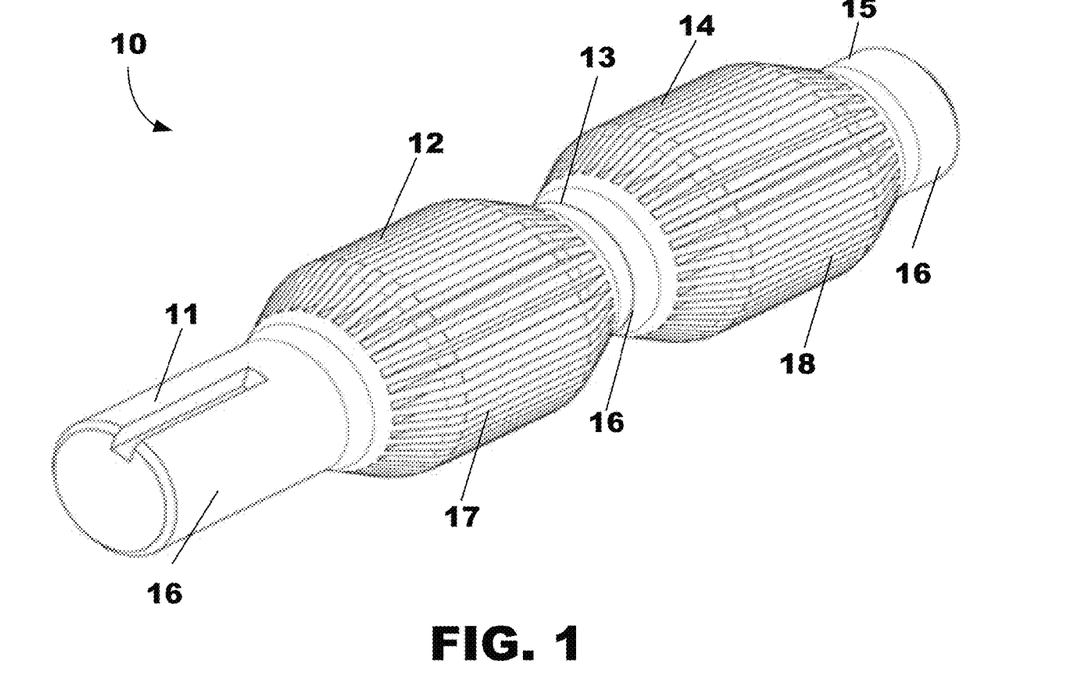
FIG. 1 illustrates an advantageous embodiment of an integrally-formed multi-property monolithic stainless steel component.

As illustrated in FIG. 1, in one or more embodiments, the integrally-formed multi-property monolithic stainless steel component 10 includes an integrally-formed monolithic body comprising iron that includes, along a longitudinal direction thereof, one or more non-magnetic regions 11, 13, 15 of low magnetic permeability having an austenitic crystalline grain structure and one or more magnetic regions 12, 14 of high magnetic permeability having a ferritic martensitic crystalline grain structure. To obtain the austenitic crystalline grain structure, the non-magnetic region(s) 11, 13, 15 may have an iron content that is lower than the iron content of the magnetic region(s) 12, 14. Meaning, to yield a magnetic property by obtaining the ferritic martensitic crystalline grain structure, the magnetic region(s) 12, 14 will have a greater iron content when compared to the non-magnetic region(s) 11, 13, 15 to amplify a magnetic permeability contrast between zones. Accordingly, the integrally-formed multi-property monolithic stainless steel component 10 includes an integrally-formed monolithic body comprising iron that includes, for example, one or more non-magnetic regions 11, 13, 15 including a plurality of fused layers having an iron content in the range of 14.5 percent to 16.5 percent that comprise an austenitic crystalline grain structure, and one or more magnetic regions 12, 14 including a plurality of fused layers having an iron content in the range of 16.5 percent to 19 percent comprising a ferritic martensitic crystalline grain structure.

The integrally-formed multi-property monolithic stainless steel component 10 can comprise a magnetic region of a stainless steel alloy having a predetermined range of iron content and other elements, which exhibit properties similar to Inconel 718 or ASTM A 286, which exhibit emphasized magnetic and non-magnetic reactions as a function of time, temperature, and chemical content (carbon, iron, and nickel). Embodiments, however, are not limited therewith, and thus, this disclosure contemplates any suitable alloy material that exhibits magnetic and non-magnetic reactions as a function of time, temperature, and chemical content.

Figure 2:
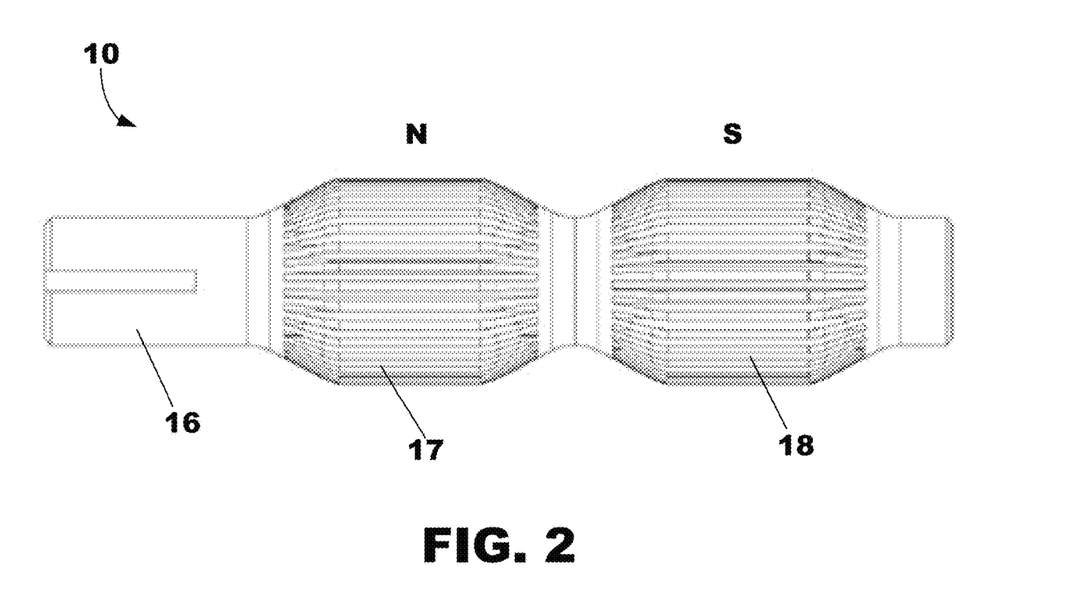
FIG. 2 illustrates the integrally-formed multi-property monolithic stainless steel component of FIG. 1.
Figure 3:
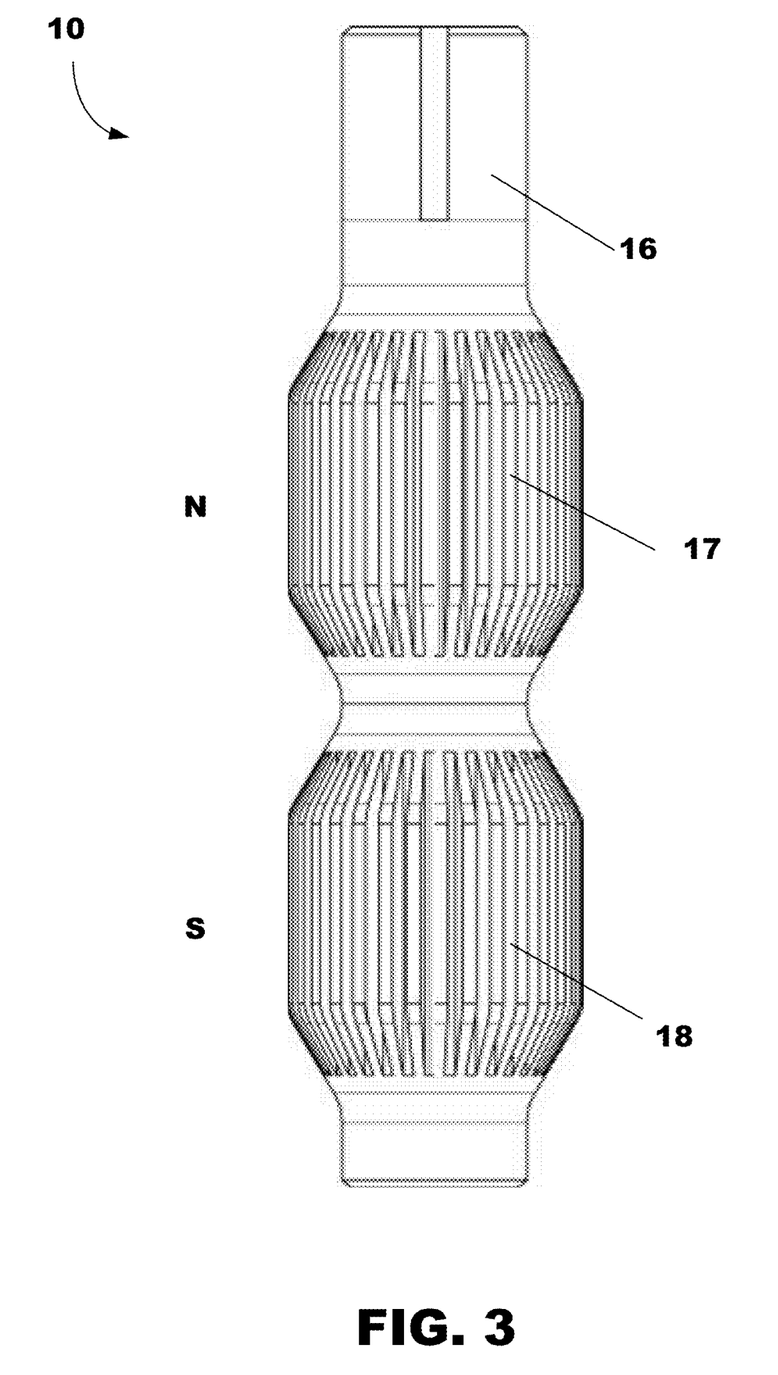
FIG. 3 illustrates the integrally-formed multi-property monolithic stainless steel component of FIG. 1.
Figure 4:
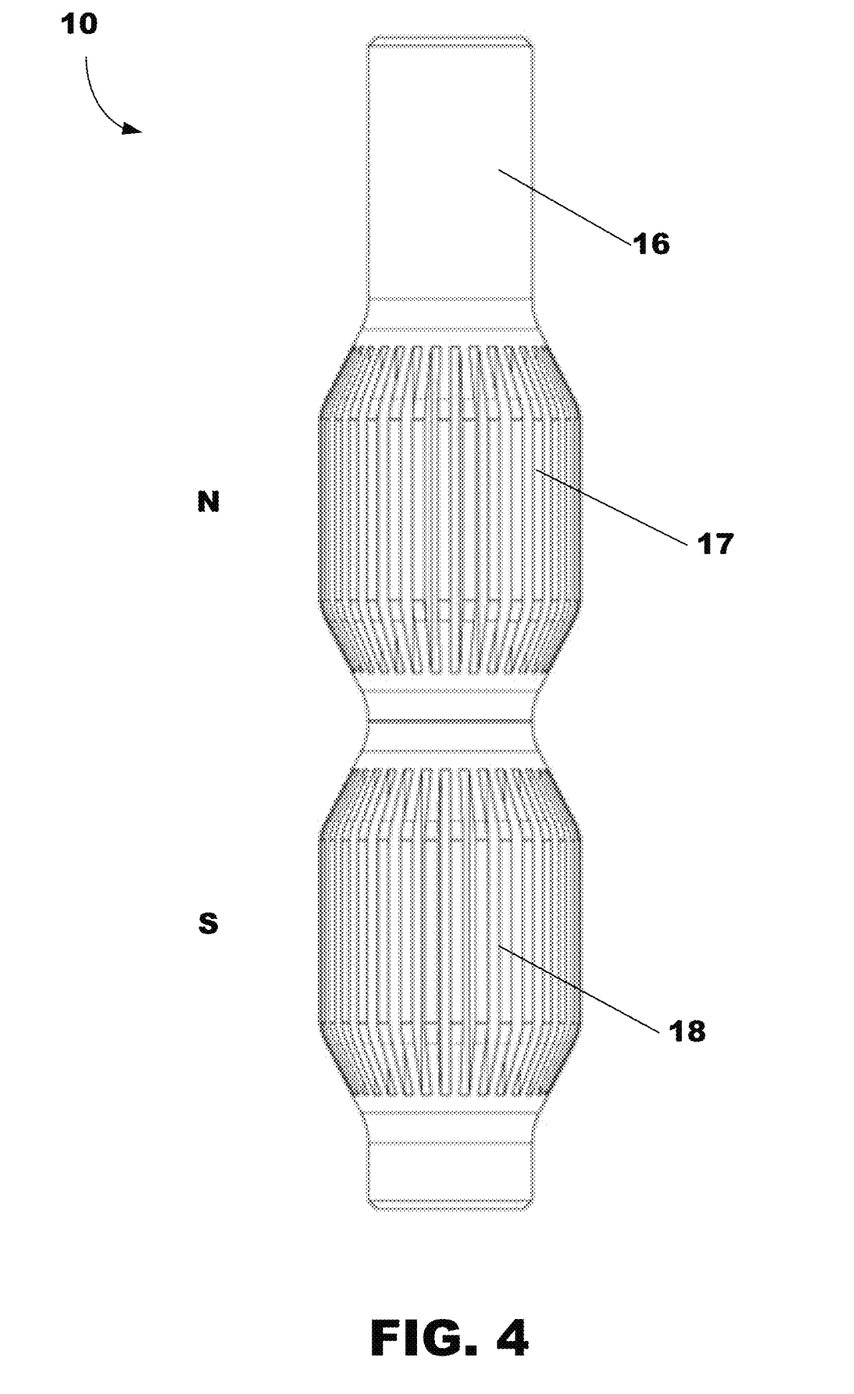
FIG. 4 illustrates the integrally-formed multi-property monolithic stainless steel component of FIG. 1.

As illustrated in FIGS. 2 through 4, in accordance with one or more embodiments, the integrally-formed monolithic stainless steel component 10 comprises a motor rotor having an integrally formed shaft 16 and rotor portion as a monolithic part of the motor rotor. In such a motor rotor, the non-magnetic region(s) 11, 13, 15 having the austenitic crystalline grain structure comprises the shaft 16, and the magnetic region(s) 12, 14 having the ferritic martensitic crystalline grain structure comprises the rotor portion that depends from the shaft 16. The rotor portion is to exhibit properties of a permanent magnet, and comprises offset magnetic poles that include a magnetic north pole 17 and a magnetic south pole 18 that extend in a longitudinal direction along the non-magnetic shaft 16. Each magnetic pole 17, 18 has a ferritic martensitic crystalline grain structure, and includes a plurality of spaced apart teeth that extend in a radial direction from the non-magnetic shaft 16.

As illustrated in Table 1, by way of example, in terms of percent chemical composition for Inconel 718, the non-magnetic region(s) 11, 13, 15 having the austenitic crystalline grain structure has an iron content in the range of 14.5 to 16.5%, whereas the magnetic region(s) 12, 14 having the ferritic martensitic crystalline grain structure has an iron content in the range of 16.5 to 19.0%. The non-magnetic region(s) 11, 13, 15 has a nickel content in the range of 49.5 to 52.5%, whereas the magnetic region(s) 12, 14 has a nickel content in the range of 52.5 to 55.5%. The non-magnetic region(s) 11, 13, 15 has a chromium content in the range of 16.5 to 19.0%, whereas the magnetic region(s) 12, 14 has a chromium content in the range of 19.0 to 21.5%. Some ranges which overlap result in the fact that the stainless steel component set forth, described, and illustrated herein has specifically targeted austenitic zones or regions of low magnetic permeability and ferritic-martensitic zones or regions of high magnetic permeability obtained by selectively controlling only the cooling rate of a single composition.

TABLE 1

| Primary Elements | % Range for Non-Magnetic Regions/Zones | % Range for Magnetic Permeable Regions/Zones |
| --- | --- | --- |
| Nickel (Ni) | 49.5-52.5 | 52.5-55.5 |
| Chromium (Cr) | 16.5-19.0 | 19.0-21.5 |
| Iron (Fe) | 14.5-16.5 | 16.5-19.0 |
| Carbon (C) | 0.05-0.07 | 0.07-0.12 |
| Niobium (Nb) | 3.95-8.8 | 3.95-8.8 |

Figure 5:
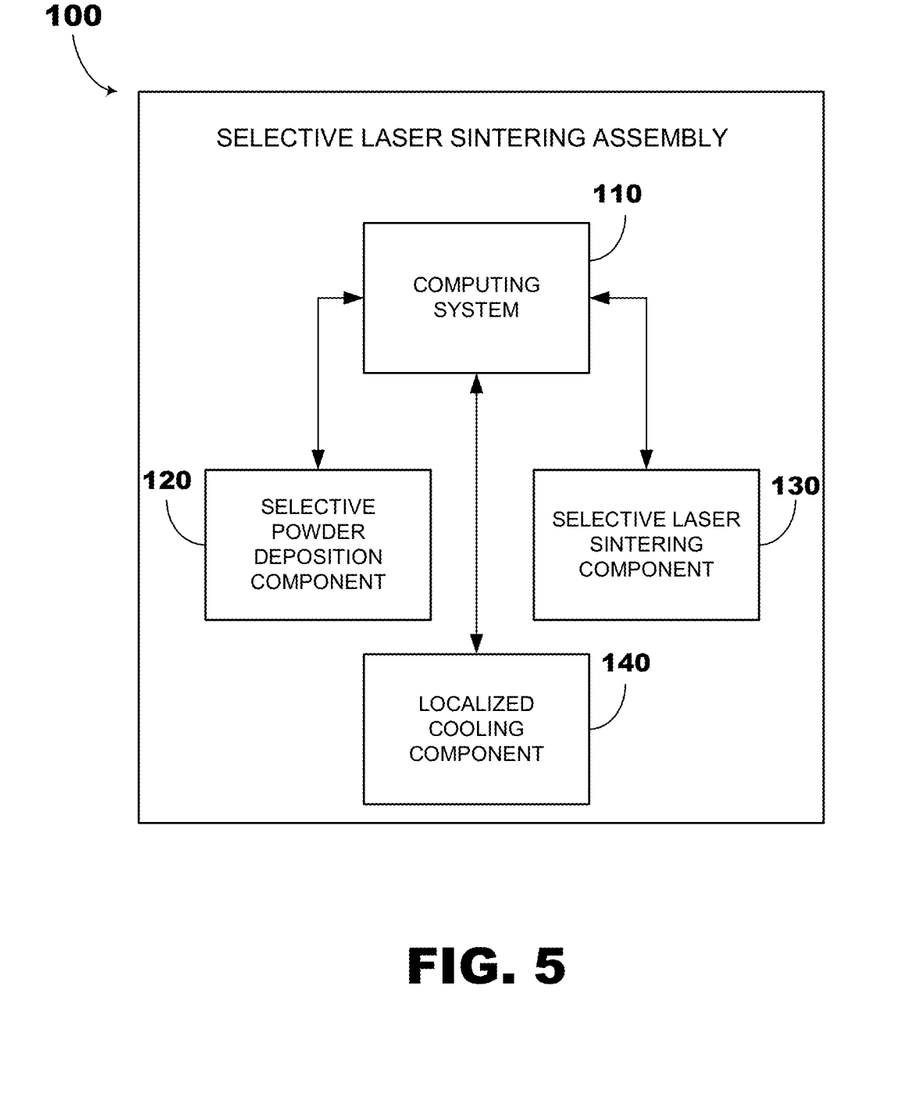
FIG. 5 illustrates an advantageous embodiment of a system for fabricating an integrally-formed multi-property monolithic stainless steel component.

FIG. 5 illustrates, in accordance with one or more embodiments, an additive manufacturing system to fabricate the multi-property monolithic stainless steel component set forth, described, and/or illustrated herein. The system comprises a selective laser sintering (SLS) assembly 100 that is to form a monolithic body having one or more vertically-extending build layers or build layer groups, and includes one or more computing systems 110 operatively coupled to a selective powder deposition component or duster 120, a selective laser sintering (SLS) component 130, and a localized cooling component 140. Meaning, integrated into selective laser sintering (SLS) assembly 100 are one or more sub-assembly components that comprises a selective powder deposition component or duster 120, a selective laser sintering (SLS) component 130, and a localized cooling component 140, each of which to be controlled during a fabrication process by one or more one or more computing systems 110.

In accordance with one or more embodiments, the computing system 110 comprises one or more processors, memory, an input/output (I/O) interface, a communication interface, and a bus. Embodiments, however, are not limited thereto, and thus, this disclosure contemplates any suitable computer system having any suitable number of any suitable components in any suitable arrangement that fall within the spirit and scope of the principles of this disclosure set forth herein.

As set forth, described, and/or illustrated herein, "processor" means any component or group of components that are configured to execute any of the processes described herein or any form of instructions to carry out such processes or cause such processes to be performed. The processor(s) can be implemented with one or more general-purpose and/or one or more special-purpose processors, such as, for example, graphics processors, microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) comprises at least one hardware circuit (e.g., an integrated circuit) configured to carry out instructions contained in program code. In embodiments in which there is a plurality of processors, such processors can work independently from each other, or one or more processors can work in combination with each other.

In accordance with one or more embodiments, during sintering of one or more build layers or build layer groups that form part of the magnetic region, the computing system 110 can cause the selective powder deposition component 120 to deposit controlled predetermined amounts of alloy powders that may differ in iron (such as iron content in the range of 16.5% to 19.0% by weight), nickel, and chromium content distributions and thereby obtain one or more magnetic regions 12, 14 having a ferritic martensitic crystalline grain structure. During sintering of one or more build layers that form part of the non-magnetic region, the computing system 110 can cause the selective powder deposition component 120 to deposit controlled amounts of iron powder (such as iron content in the range of 14.5% to 16.5% by weight), nickel powder, and chromium powder and obtain one or more non-magnetic regions 11, 13, 15 having an austenitic crystalline grain structure. Similarly, the selective power deposition component 120 can be controlled to deposit controlled amounts of nickel at less than 52.5 percent and chromium at less than 19 percent in build layers within the non-magnetic regions, and to deposit controlled amounts of nickel of at least 52.5 percent and of chromium of at least 19 percent in build layers within the magnetic regions. The selective powder deposition component 120 comprises a powder bed machine (Selective Laser Melting SLS) or duster having one or more patterning drums to selectively deposit fine powder voxels in a line-at-once manner. Embodiments, however, are not limited thereto, and thus, this disclosure contemplates any suitable deposition component that falls within the spirit and scope of the principles of this disclosure set forth herein.

In accordance with one or more embodiments, the computing system 110 can cause the selective laser sintering component 130, comprising one or more lasers (e.g., a dual laser or a quad laser), to selectively fuse, via a laser, the controlled predetermined deposited amounts of powdered alloy material having different element distributions (e.g., for stainless steel, different distributions of iron, nickel, and chromium) in an individual build layer or build layer group by scanning cross-sections generated from a 3-D digital description of the component on the surface of a powder bed. In operation, at each individual build layer or build layer group, after deposition of the powdered alloy material, the SLS component 130 is caused to selectively fuse the powdered alloy material.

In accordance with one or more embodiments, the computing system 110 can cause the localized cooling component 140 to selectively control, in situ, the crystalline grain structure of each individual build layer or build layer group to form in the monolithic body one or more non-magnetic regions of low magnetic permeability having an austenitic crystalline grain structure and one or more magnetic regions of high magnetic permeability having a ferritic martensitic crystalline grain structure. In particular, the localized cooling component 140 is configured to provide, in situ, localized cooling at a cooling rate within a predetermined range at specifically-targeted zones or regions of each individual build layer or build layer group that forms part of the magnetic region having controlled amounts of iron (in the range of 16.5% to 19.0% by weight) to control the crystalline grain structure in a manner that obtains magnetic regions of high magnetic permeability having a ferritic martensitic crystalline grain structure. The localized cooling component 140 is further configured to provide, in situ, localized cooling that may be less than the predetermined rate (the rate used for magnetic regions) at specifically-targeted zones or regions of each build layer or build layer group that forms part of the non-magnetic region having controlled predetermined amounts of iron (in the range of 14.5% to 16.5% by weight), to control the crystalline grain structure in a manner that obtains non-magnetic regions having an austenitic crystalline grain structure. In operation, at each individual build layer or build layer group, after the selective fusing of the powdered alloy material by the SLS component 130, the localized cooling component 140 is caused to provide localized cooling at specifically-targeted zones or regions of an individual build layer or build layer group.

In accordance with one or more embodiments, the localized cooling component 140 comprises a CNC local cooling component having a movable robotic arm configured to move in response to one or more predetermined commands from the computing system 110 to modify the cooling rate at specifically-targeted zones or regions via a localized quenching process that uses a chilled or controlled temperature inert gas directed at the surface of a specifically-targeted region of an individual build layer or build layer group. Such localized cooling thereby controls the cooling temperature of the phase transformation. The localized cooling may be a gas flow rate providing a predetermined amount of cooling (or forced convection) in terms of BTU/hr or Watts, which may be, for example, a gas flow that is sufficient to yield a cooling rate in the targeted build layer or group of build layers, of between 3 to 220 degrees Celsius per second (° C./s), where it is believed that such a rate is necessary for Martensite crystalline structure to be achieved.

Alternatively or additionally, in accordance with one or more embodiments, thermal arrest holds may be conducted in which a predetermined temperature of a targeted build layer or group of build layers may be maintained for a predetermined period of time. For example, a thermal arrest hold for a stainless steel alloy is, but not limited to, maintaining a constant 700° C. for 0.1 hours. Another example of a thermal arrest hold for a stainless steel alloy is, but not limited to, maintaining a constant 600° Celsius for 0.9 hours, where it is believed that the martensite region can be maintained until the internal temperature of the part reaches equilibrium.

Accordingly, to obtain non-magnetic properties having an austenitic stainless steel crystalline grain structure at a specifically-targeted region of an individual build layer or build layer group, the robotic arm is to cool the build layer or build layer group at a cooling rate that facilitates the achievement of the austenitic crystalline grain structure in accordance with the time-temperature transformation diagram for a specific alloy for the component (e.g., in the illustrated example, Inconel 718). The localized cooling process can be repeated until the section of the component requiring non-magnetic properties is completed. To obtain magnetic properties having a ferritic martensitic stainless steel crystalline grain structure at a specifically-targeted region of an individual build layer or build layer group, the robotic arm is to cool the build layer or build layer group at a cooling rate that facilitates the achievement of the ferritic martensitic crystalline grain structure in accordance with the time-temperature transformation diagram for a specific alloy for the component (e.g., in the illustrated example, Inconel 718).

Figure 6:
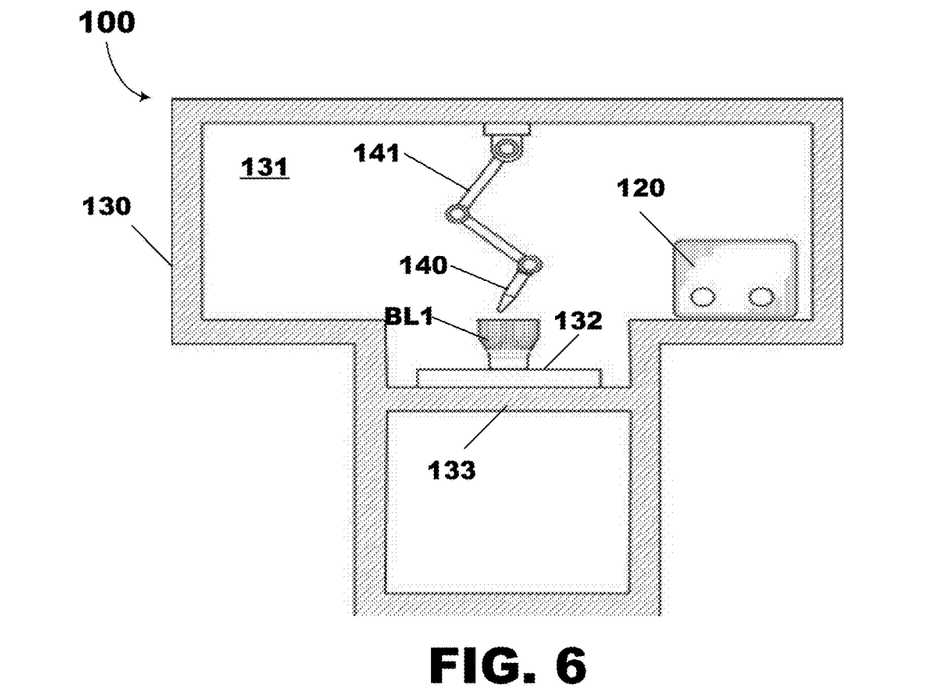
FIGS. 6 through 8 schematically illustrate an advantageous embodiment operations performed by one or more embodiments to fabricate an integrally-formed multi-property monolithic stainless steel component.
Figure 7:
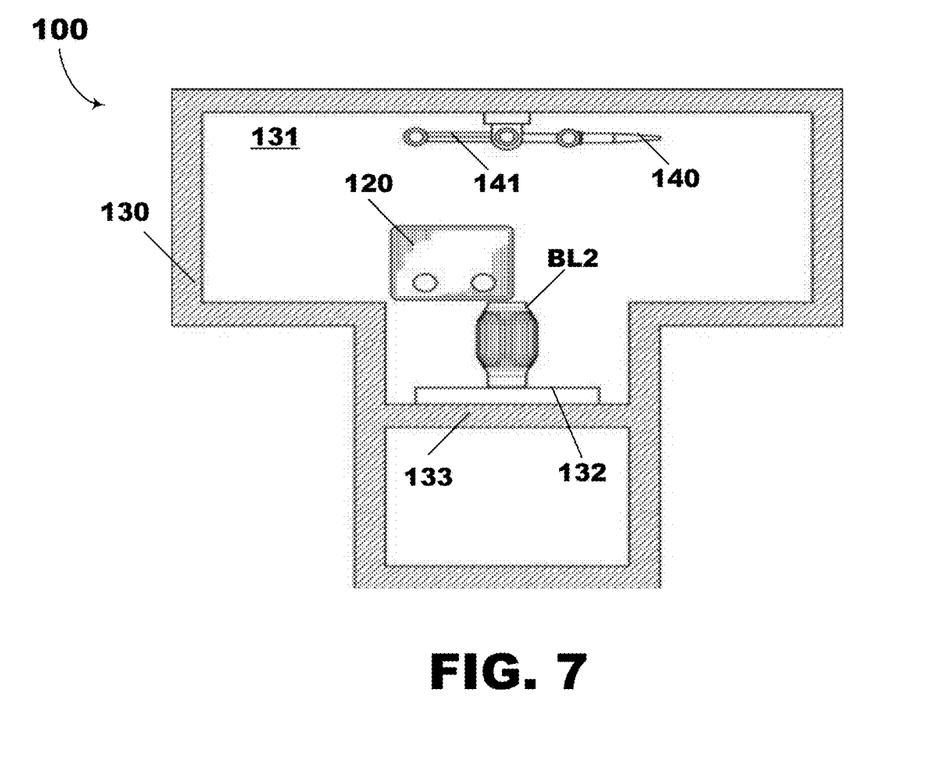
Figure 8:
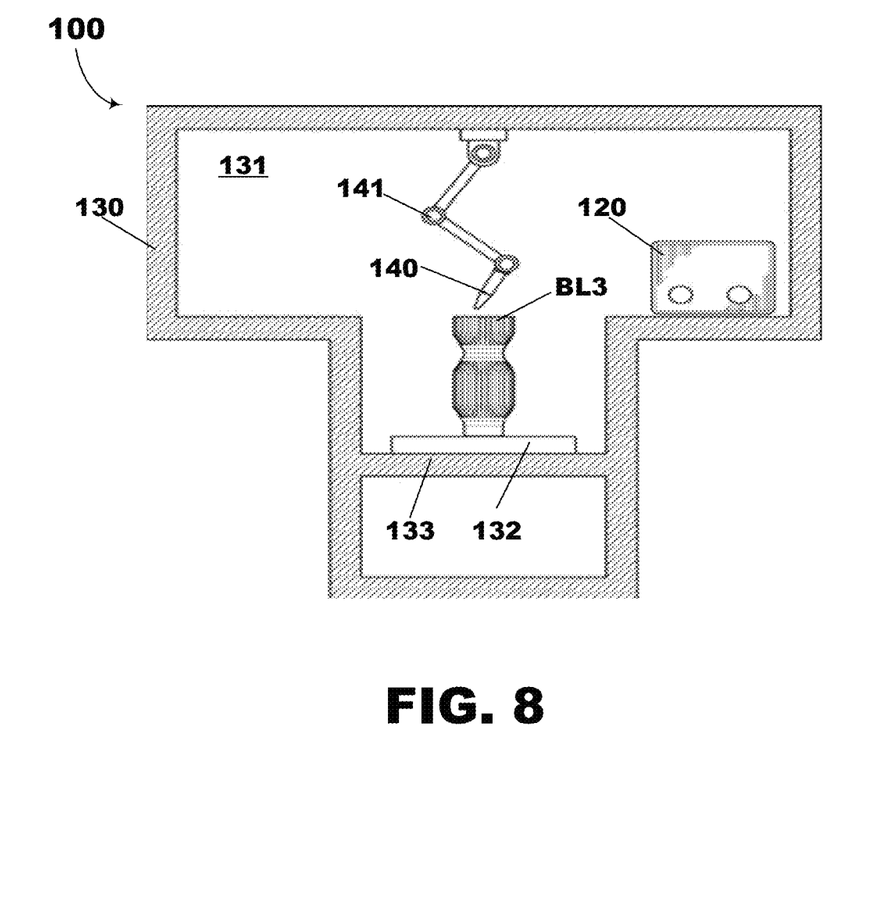

FIGS. 6 through 8 illustrate a method of fabricating, via the system 100, a multi-property monolithic stainless steel component, in accordance with one or more embodiments. The SLS component 130 comprises a structure that defines a chamber 131 wherein the subassembly components 120, 130, 140, are arranged and the fabrication process or method is to be implemented. The laser(s) of the SLS component 130 can be arranged to permit placement of the localized cooling component 140 at or adjacent to the center of the ceiling of the chamber. In that way, the robotic arm of the localized cooling component 140 does not interfere with the lasers. Embodiments, however, are not limited thereto, and thus, this disclosure contemplates any suitable arrangement of the lasers and the localized cooling component 140 that falls within the spirit and scope of the principles of this disclosure set forth herein.

As illustrated in FIG. 6, fabrication of a multi-property monolithic stainless steel component begins with an initial or first build layer group BL1 (comprising one or more individual build layers) of a monolithic body comprising controlled predetermined amounts of the powdered alloy material having different element distributions (e.g., for stainless steel, different distributions of iron, nickel, and chromium) is selectively deposited on a support base or powder bed 132 by the powder deposition component 120. The multi-property monolithic stainless steel component is fabricated in an upright orientation in an SLS machine to avoid any need for an additional support structure. Thus, there is no manual removal of support material.

The deposited powdered alloy material is then selectively sintered by one or more lasers of the selective laser sintering component 130. In the illustrated embodiment, the localized cooling component 140 is deployed, via a robotic arm 141, to dispense a controlled chilled inert gas (e.g., nitrogen, argon) and thereby provide localized cooling at specifically-targeted zones or regions of the first build layer group BL1.

As illustrated in FIG. 7, upon completion of the localized cooling of the first build layer group BL1, a vertically moveable build platform 133 is caused to move in a downward direction one step (e.g., one build layer thickness may comprise 20 to 90 microns) per each build layer in order that the powder deposition component 120 can deposit a second build layer group BL2 (comprising one or more individual build layers) on the first build layer group BL1.

As illustrated in FIG. 8, upon completion of the localized cooling of the second build layer group BL2, the build platform 133 is caused to move again in a downward direction one step per each build layer in order that the powder deposition component 120 can deposit a third build layer group BL3 (comprising one or more individual build layers) on the second build layer group BL3. The deposited powdered alloy material is then selectively sintered by one or more lasers of the selective laser sintering component 130. In the illustrated embodiment, the localized cooling component 140 is deployed to dispense the controlled chilled inert gas and thereby provide localized cooling at specifically-targeted zones or regions of the third build layer group BL3.

The process is repeated for each subsequent build layer group, and then terminated or stopped upon a determination that the 3-D digital description of the multi-property alloy component has been completed or fulfilled. The multi-property monolithic stainless steel component can then be cut off from the support base or powder bed 132 and then turned in a CNC lathe for final surface finish and machined details like the key cut. Thereafter, the one or more magnetic regions having a ferritic martensitic crystalline grain structure of the multi-property monolithic stainless steel component undergo magnetic induction to magnetize the region(s) and/or establish a uniform magnetic field direction in the magnetic region(s).

Figure 9:
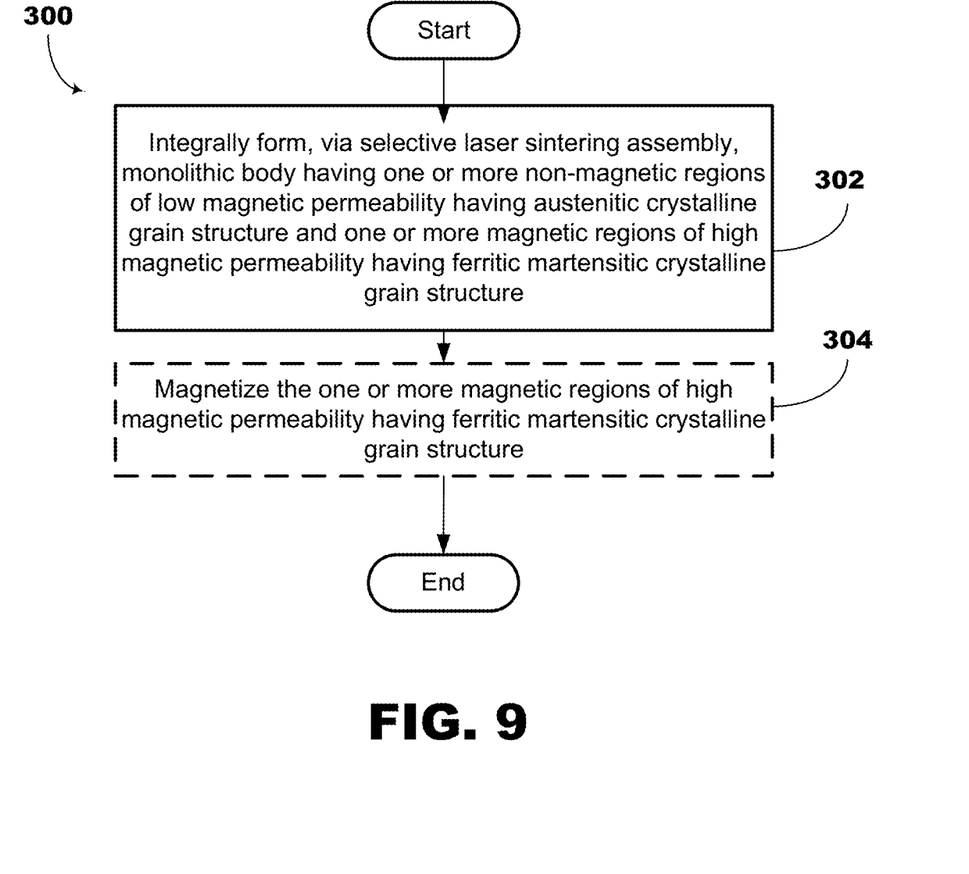
FIGS. 9 and 10 respectively illustrate operations performed by one or more embodiments to fabricate an integrally-formed multi-property monolithic stainless steel component.
Figure 10:
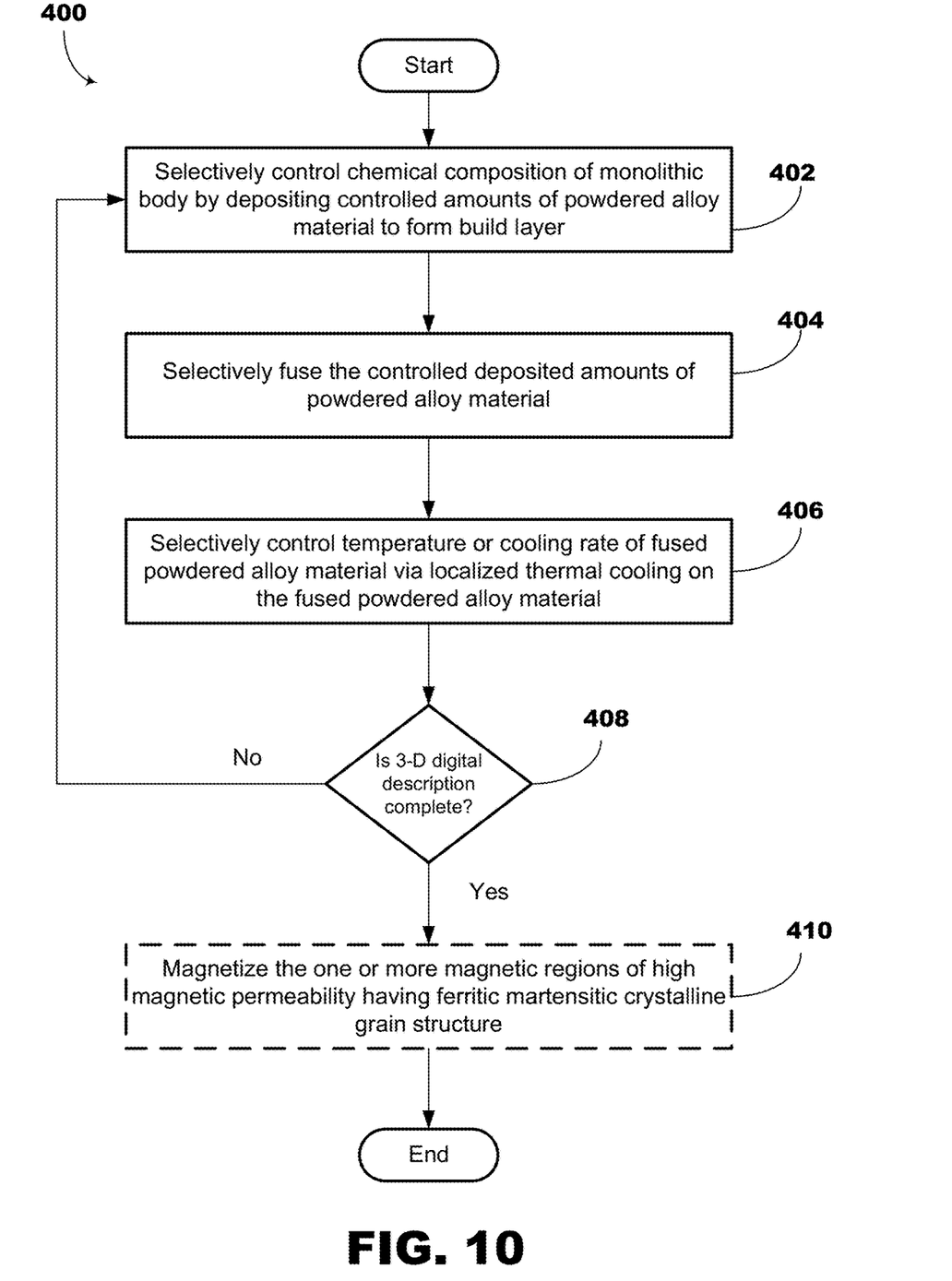

FIGS. 9 and 10 respectively illustrate flowcharts of methods 300, 400 of fabricating a multi-property monolithic stainless steel component, in accordance with embodiments. The flowchart of the methods 300, 400 respectively correspond to the schematic illustrations of the method illustrated in FIGS. 6 through 8, and which is set forth and described herein. In accordance with one or more embodiments, the methods 300, 400 can be implemented by the computing system 110. For example, the computing system 110 can implement the methods 300, 400 using logic instructions (e.g., software), configurable logic, fixed-functionality hardware logic, etc., or any combination thereof. As an example, software executed on the computing system 110 can provide functionality described or illustrated herein. In particular, software executing on the computing system 110 can perform one or more fabrication or processing blocks of the methods 300, 400 set forth, described, and/or illustrated herein, or provides functionality set forth, described, and/or illustrated.

As illustrated in FIG. 9, the method 300 of fabricating a multi-property monolithic stainless steel component can be initiated at illustrated process block 302, which includes integrally forming, via a selective laser sintering assembly, a monolithic body having one or more vertically-extending build layers or build layer groups comprising iron, by selectively controlling, in situ, via the selective laser sintering assembly, a chemical composition and temperature of each build layer, each build layer including along a longitudinal direction of the monolithic body, one or more non-magnetic regions having an austenitic crystalline grain structure and one or more magnetic regions having a ferritic martensitic crystalline grain structure.

The method 300 can terminate or end after completion of illustrated process block 302. Alternatively, the method 300 can then proceed to illustrated process block 304, which includes magnetizing, via magnetic induction, the one or more magnetic regions having a ferritic martensitic crystalline grain structure. The method 300 can then terminate or end after completion of process block 304.

As illustrated in FIG. 10, the method 400 of fabricating a multi-property monolithic stainless steel component can be initiated at illustrated process block 402, which selectively controlling the chemical composition by depositing, via a selective powder deposition component of a selective laser sintering assembly, controlled amounts of two predetermined alloy distributions having different element qualities to obtain one or more non-magnetic regions having an austenitic crystalline grain structure and one or more magnetic regions having a ferritic martensitic crystalline grain structure.

The selective control comprises depositing controlled amounts controlled amounts of two predetermined alloy distributions having different element qualities such that the one or more non-magnetic regions have a lower iron content than the one or more magnetic regions, to thereby obtain the austenitic crystalline grain structure. The selective control comprises depositing controlled amounts of iron powder such that the one or more magnetic regions have a greater iron content than the one or more non-magnetic regions, to thereby obtain the ferritic martensitic crystalline grain structure.

The method 400 can then proceed to illustrated process block 404, which includes selectively fusing, via a selective laser sintering component of the selective laser sintering assembly, the controlled deposited amounts of controlled amounts of two predetermined alloy distributions having different element qualities of the build layer.

The method 400 can then proceed to illustrated process block 406, which includes selectively controlling the temperature or cooling rate of the fused powdered alloy material by performing, via a cooling component of the selective laser sintering assembly, localized thermal cooling on the fused powdered alloy material of the build layers or build layer groups. The selective control comprises robotically directing the localized cooling component towards the fused powdered alloy material to direct a predetermined flow rate of cooling fluid onto the fused powdered alloy material to facilitate formation of the ferritic martensitic crystalline grain structure in the one or more magnetic regions.

In accordance with the method 400, depositing controlled amounts of the powdered alloy material comprises, after imparting non-magnetic or magnetic properties on a build layer, lowering the powder bed of the selective laser sintering assembly by one vertical build layer thickness and then applying another build layer of powdered alloy material on the build layer.

The method 400 can then proceed to illustrated process block 408, which includes a determination of whether the 3-D digital description of the multi-property alloy component has been completed or fulfilled. If "No," then the method 400 returns to process block 402 whereby a new build layer is formed on the previously formed build layer. If "Yes," i.e., the 3-D digital description of the multi-property alloy component has been completed, the method 400 can terminate or end.

Alternatively, if "Yes," the method 400 can then proceed to illustrated process block 410, which includes magnetizing, via magnetic induction, the one or more magnetic regions having a ferritic martensitic crystalline grain structure. The method 400 can then terminate or end after completion of process block 410.

Additional Notes and Examples

Example One includes a multi-property monolithic stainless steel component, comprising: an integrally-formed monolithic body comprising iron that includes, along a longitudinal direction thereof, one or more non-magnetic regions having an austenitic crystalline grain structure and one or more magnetic regions having a ferritic martensitic crystalline grain structure.

Example Two may include the multi-property monolithic stainless steel component of Example One, wherein: the one or more non-magnetic regions have a lower iron content to obtain the austenitic crystalline grain structure, and the one or more magnetic regions have a higher iron content to obtain the ferritic martensitic crystalline grain structure.

Example Three may include the multi-property monolithic stainless steel component of Example Two, wherein: the one or more non-magnetic regions have an iron content in the range of 14.5 to 16.5%, and the one or more magnetic regions have an iron content in the range of 16.5 to 19.0%.

Example Four may include the multi-property monolithic stainless steel component of Example Two, wherein: the one or more magnetic regions have a nickel content in the range of 52.5 to 55.5%, and the one or more magnetic regions have a chromium content in the range of 19.0 to 21.5%.

Example Five may include the multi-property monolithic stainless steel component of Example One, wherein: the integrally-formed monolithic body comprises a motor rotor, the one or more non-magnetic regions having the austenitic crystalline grain structure comprises a shaft of the motor rotor, and the one or more magnetic regions having the ferritic martensitic crystalline grain structure comprises a rotor portion depending from and integrally formed with the shaft as a monolithic part of the motor rotor, and which exhibits properties of a permanent magnet.

Example Six includes a method of fabricating a multi-property monolithic stainless steel component, the method comprising: forming, via a selective laser sintering assembly, a monolithic body having one or more vertically-extending build layer groups comprising iron by selectively controlling, in situ via the selective laser sintering assembly, a chemical composition and temperature of each build layer, each build layer including along a longitudinal direction of the monolithic body, one or more non-magnetic regions having an austenitic crystalline grain structure and one or more magnetic regions having a ferritic martensitic crystalline grain structure.

Example Seven may include the method of Example Six, wherein selectively controlling the chemical composition comprises depositing, via a selective powder deposition component of the selective laser sintering assembly, controlled amounts of two predetermined alloy distributions having different element qualities to obtain the one or more non-magnetic regions having the austenitic crystalline grain structure and the one or more magnetic regions having the ferritic martensitic crystalline grain structure.

Example Eight may include the method of Example Seven, wherein selectively controlling the chemical composition comprises depositing, via a selective powder deposition component of the selective laser sintering assembly, a greater iron content alloy amount such that the one or more non-magnetic regions have a lower iron content than the one or more magnetic regions, to thereby obtain the austenitic crystalline grain structure.

Example Nine may include the method of Example Eight, wherein selectively controlling the chemical composition comprises depositing, via the selective powder deposition component of the selective laser sintering assembly, controlled amounts of two predetermined alloy distributions having different element qualities such that the one or more magnetic regions have a greater iron content than the one or more non-magnetic regions, to thereby obtain the ferritic martensitic crystalline grain structure.

Example Ten may include the method of Example Nine, further comprising selectively fusing, via a selective laser sintering component of the selective laser sintering assembly, the controlled deposited amounts of the two predetermined alloy distributions having different element qualities.

Example Eleven may include the method of Example Six, wherein selectively controlling the temperature comprises performing, via a localized cooling component of the selective laser sintering assembly, localized thermal cooling of the fused build layer groups.

Example Twelve may include the method of Example Eleven, wherein selectively controlling the temperature via a cooling component comprises directing the localized cooling component towards the fused build layer groups to direct a predetermined flow rate of cooling fluid onto the fused build layers that include the controlled deposited amounts of the two predetermined alloy distributions having different element qualities, to facilitate the formation of the ferritic martensitic crystalline grain structure in the one or more magnetic regions.

Example Thirteen may include the method of Example Six, further comprising magnetizing the one or more magnetic regions having the ferritic martensitic crystalline grain structure by subjecting the monolithic body to magnetic induction.

Example Fourteen includes a system for fabricating a multi-property monolithic stainless steel component, the system comprising: a selective laser sintering assembly to form a monolithic body having one or more vertically-extending build layer groups, the selective laser sintering assembly comprising: a selective powder deposition component to deposit controlled amounts of two predetermined alloy distributions having different element qualities and obtain one or more non-magnetic regions having an austenitic crystalline grain structure and one or more magnetic regions having a ferritic martensitic crystalline grain structure, a selective laser sintering component to selectively fuse the controlled deposited amounts of the two predetermined alloy distributions having different element qualities in the build layer groups, and a localized cooling component to selectively control, in situ, the crystalline grain structure of each build layer to form in the monolithic body one or more non-magnetic regions having an austenitic crystalline grain structure and one or more magnetic regions having a ferritic martensitic crystalline grain structure.

Example Fifteen may include the method of Example Fourteen, wherein the selective powder deposition component deposits controlled amounts of two predetermined alloy distributions having different element qualities such that the one or more non-magnetic regions have a lower iron content than the one or more magnetic regions, to thereby obtain the austenitic crystalline grain structure.

Example Sixteen may include the method of Example Fifteen, wherein the selective powder deposition component deposits a greater iron content alloy amount such that the one or more magnetic regions have a greater iron content than the one or more non-magnetic regions, to thereby obtain the ferritic martensitic crystalline grain structure.

Example Seventeen may include the method of Example Fourteen, wherein the localized cooling component provides localized thermal cooling of the fused build layer groups and thereby selectively controls one or more of a cooling temperature and a cooling rate of the monolithic body.

Example Eighteen may include the method of Example Seventeen, wherein the localized cooling component selectively controls one or more of a cooling temperature and a cooling rate of the fused build layer groups.

Example Nineteen may include the method of Example Eighteen, wherein the localized cooling component comprises a moveable robotic arm configured to position the localized cooling component proximate the build layer groups to direct a predetermined flow rate of cooling fluid onto the build layer groups that include the deposition of controlled amounts of two predetermined alloy distributions having different element qualities to facilitate the formation of the ferritic martensitic crystalline grain structure in the one or more magnetic regions.

Example Twenty may include the method of Example Fourteen, further comprising a magnetic induction device to magnetize the one or more magnetic regions having the ferritic martensitic crystalline grain structure by subjecting the monolithic body to magnetic induction.

The terms "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the embodiments of the present disclosure can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A multi-property monolithic alloy component, comprising:
   two or more non-magnetic regions having an austenitic crystalline grain structure, wherein each of the two or more non-magnetic regions comprises a plurality of first build layers each of which has a first build layer thickness of 20 to 90 microns, and
   one or more magnetic regions fused between at least two of the two or more non-magnetic regions, the one or more magnetic regions having a ferritic-martensitic crystalline grain structure, wherein each of the one or more magnetic regions comprises a plurality of second build layers each of which has a second build layer thickness of 20 to 90 microns,
   wherein the two or more non-magnetic regions are fused to the one or more magnetic regions to form an integrally-formed monolithic body that has a monolithic structure integrally-formed of a single fused piece,
   wherein the one or more magnetic regions and the two or more non-magnetic regions are alternately located along a longitudinal direction,
   wherein an iron content of the two or more non-magnetic regions is in a range of 14.5 to 16.5% by weight,
   wherein the one or more magnetic regions have a chromium content in a range of 19.0 to 21.5% by weight.

2. The multi-property monolithic alloy component of claim 1, wherein:
   the two or more non-magnetic regions have a lower iron content to obtain the austenitic crystalline grain structure, and
   the one or more magnetic regions have a higher iron content to obtain the ferritic-martensitic crystalline grain structure.

3. The multi-property monolithic alloy component of claim 1, wherein:
   the integrally-formed monolithic body comprises a motor rotor,
   the two or more non-magnetic regions having the austenitic crystalline grain structure comprises a shaft of the motor rotor, and
   the one or more magnetic regions having the ferritic-martensitic crystalline grain structure comprises a rotor portion depending from and integrally formed with the shaft as a monolithic part of the motor rotor, and which exhibits properties of a permanent magnet, wherein an iron content of the two or more non-magnetic regions is less than or equal to the iron content of the one or more magnetic regions, wherein a nickel content of the one or more magnetic regions is higher than the iron content of the one or more magnetic regions and a chromium content of the one or more magnetic regions that is equal to or higher than the iron content of the one or more magnetic regions.

4. The multi-property monolithic alloy component of claim 3, wherein:
the rotor portion comprises a plurality of spaced apart teeth that extend in a radial direction from the shaft.

5. The multi-property monolithic alloy component of claim 1, wherein:
the two or more non-magnetic regions have a nickel content in a range of 49.5 to 52.5% by weight.

6. The multi-property monolithic alloy component of claim 1, wherein:
the two or more non-magnetic regions have a chromium content in a range of 16.5 to 19.0% by weight.

7. The multi-property monolithic alloy component of claim 3, wherein:
the two or more non-magnetic regions have a lower iron content compared to the one or more magnetic regions to obtain the austenitic crystalline grain structure, and
the one or more magnetic regions have a higher iron content compared to the two or more non-magnetic regions to obtain the ferritic-martensitic crystalline grain structure.

8. The multi-property monolithic alloy component of claim 1, wherein the multi-property monolithic alloy component is a component in a micro-electric motor.

9. A multi-property monolithic alloy component, comprising:
a motor rotor comprising an integrally-formed multi-property monolithic stainless steel body defining a longitudinal direction, the integrally-formed multi-property monolithic stainless steel body comprising:
a shaft comprising two or more non-magnetic regions along a longitudinal direction of the integrally-formed multi-property monolithic stainless steel body, the two or more non-magnetic regions having an austenitic crystalline grain structure, wherein each of the two or more non-magnetic regions comprises a plurality of first build layers each of which has a first build layer thickness of 20 to 90 microns, and
one or more magnetic regions fused between at least two of the two or more non-magnetic regions along the longitudinal direction of the integrally-formed multi-property monolithic stainless steel body, the one or more magnetic regions having a ferritic-martensitic crystalline grain structure, wherein each of the one or more magnetic regions comprises a plurality of second build layer thicknesses each of which has a second build layer thickness of 20 to 90 microns,
wherein the two or more non-magnetic regions are fused to the one or more magnetic regions to form the integrally-formed multi-property monolithic stainless steel body that has a monolithic structure integrally-formed of a single fused piece,
wherein the one or more magnetic regions and the two or more non-magnetic regions are alternately located along the longitudinal direction, wherein an iron content of the two or more non-magnetic regions is in a range of 14.5 to 16.5% by weight, wherein the one or more magnetic regions have a chromium content in a range of 19.0 to 21.5% by weight.

10. The multi-property monolithic alloy component of claim 9, wherein:
the two or more non-magnetic regions have a lower iron content compared to the one or more magnetic regions to obtain the austenitic crystalline grain structure, and
the one or more magnetic regions have a higher iron content compared to the two or more non-magnetic regions to obtain the ferritic-martensitic crystalline grain structure.

11. The multi-property monolithic alloy component of claim 9, wherein:
the one or more magnetic regions exhibit properties of a permanent magnet,
an iron content of the two or more non-magnetic regions is less than or equal to the iron content of the one or more magnetic regions,
wherein a nickel content of the one or more magnetic regions is equal to or higher than the nickel content of the two or more non-magnetic regions and a chromium content of the one or more magnetic regions that is equal to or higher than the chromium content of the two or more non-magnetic regions.

12. The multi-property monolithic alloy component of claim 11 wherein the one or more magnetic regions comprise a plurality of spaced apart teeth that extend in a radial direction from the longitudinal direction of the integrally-formed multi-property monolithic stainless steel body.

13. The multi-property monolithic alloy component of claim 11 wherein:
the two or more non-magnetic regions have a lower iron content to obtain the austenitic crystalline grain structure, and
the one or more magnetic regions have a higher iron content to obtain the ferritic-martensitic crystalline grain structure.

14. The multi-property monolithic alloy component of claim 9, wherein the two or more non-magnetic regions have a nickel content in a range of 49.5 to 52.5% by weight.

15. The multi-property monolithic alloy component of claim 9, wherein the one or more non-magnetic regions have a chromium content in a range of 16.5 to 19.0% by weight.

16. The multi-property monolithic alloy component of claim 9, wherein the motor rotor is located in a micro-electric motor.

17. A multi-property monolithic alloy component, comprising
a motor rotor comprising an integrally-formed multi-property monolithic stainless steel body defining a longitudinal direction, the integrally-formed multi-property monolithic stainless steel body comprising:
a shaft comprising two or more non-magnetic regions along a longitudinal direction of the integrally-formed multi-property monolithic stainless steel body, the two or more non-magnetic regions having an austenitic crystalline grain structure, wherein each of the two or more non-magnetic regions comprises a plurality of first build layers each of which has a first build layer thickness of 20 to 90 microns, and
one or more magnetic regions fused between at least two of the two or more non-magnetic regions along the longitudinal direction of the integrally-formed multi-property monolithic stainless steel body, the one or more magnetic regions having a ferritic-martensitic crystalline grain structure, wherein each of the one or more magnetic regions comprises a plurality of second build layers each of which has a second build layer thickness of 20 to 90 microns, wherein the two or more non-magnetic regions are fused to the one or more magnetic regions to form the integrally-formed multi-property monolithic stainless steel body that has a monolithic structure integrally-formed of a single fused piece, wherein the one or more magnetic regions and the two or more non-magnetic regions are alternately located along the longitudinal direction, wherein an iron content of the two or more non-magnetic regions is in a range of 14.5 to 16.5% by weight, wherein the one or more magnetic regions have a chromium content in a range of 19.0 to 21.5% by weight, wherein the two or more non-magnetic regions have a lower iron content compared to the one or more magnetic regions to obtain the austenitic crystalline grain structure, the one or more magnetic regions have a higher iron content compared to the two or more non-magnetic regions to obtain the ferritic-martensitic crystalline grain structure, the one or more magnetic regions exhibit properties of a permanent magnet, wherein a nickel content of the one or more magnetic regions is equal to or higher than the nickel content of the two or more non-magnetic regions and a chromium content of the one or more magnetic regions that is equal to or higher than the chromium content of the two or more non-magnetic regions.

18. The multi-property monolithic alloy component of claim 17 wherein the one or more magnetic regions comprise a plurality of spaced apart teeth that extend in a radial direction from the longitudinal direction of the integrally-formed multi-property monolithic stainless steel body.

19. The multi-property monolithic alloy component of claim 17 wherein:

the two or more non-magnetic regions have a lower iron content to obtain the austenitic crystalline grain structure, and the one or more magnetic regions have a higher iron content to obtain the ferritic-martensitic crystalline grain structure.

20. The multi-property monolithic alloy component of claim 17, wherein the two or more non-magnetic regions have a nickel content in a range of 49.5 to 52.5% by weight.

21. The multi-property monolithic alloy component of claim 17, wherein the one or more non-magnetic regions have a chromium content in a range of 16.5 to 19.0% by weight.

* * * * *